US008433426B2

(12) United States Patent
Cleland et al.

(10) Patent No.: US 8,433,426 B2
(45) Date of Patent: Apr. 30, 2013

(54) ADAPTIVE ENERGY PERFORMANCE MONITORING AND CONTROL SYSTEM

(75) Inventors: Donald A. Cleland, Langford (CA); Laurence E. Kubek, Victoria (CA); Carol A. Wong, Victoria (CA); Colleen D. McCarthy, Saanich (CA); Gordon A. Duval, Victoria (CA)

(73) Assignee: LED Roadway Lighting Ltd, Halifax (CA)

( * ) Notice: Subject to any disclaimer, the term of this patent is extended or adjusted under 35 U.S.C. 154(b) by 943 days.

(21) Appl. No.: 11/479,222

(22) Filed: Jun. 30, 2006

(65) Prior Publication Data
US 2007/0043540 A1 Feb. 22, 2007

Related U.S. Application Data

(60) Provisional application No. 60/695,252, filed on Jun. 30, 2005, provisional application No. 60/695,459, filed on Jun. 30, 2005.

(51) Int. Cl.
*G05B 11/01* (2006.01)

(52) U.S. Cl.
USPC .......................................................... 700/27

(58) Field of Classification Search ................ 700/1, 14, 700/19, 27
See application file for complete search history.

(56) References Cited

U.S. PATENT DOCUMENTS

| 3,894,265 A | 7/1975 | Holmes et al. |
| 3,989,976 A | 11/1976 | Tabor |
| 4,082,981 A | 4/1978 | Morton et al. |
| 4,350,930 A | 9/1982 | Peil et al. |
| 4,516,056 A | 5/1985 | Cote |
| 4,615,009 A | 9/1986 | Battocletti et al. |
| 4,642,525 A | 2/1987 | Widmayer |
| 4,647,763 A | 3/1987 | Blake |

(Continued)

FOREIGN PATENT DOCUMENTS

| EP | 0067011 A2 | 5/1982 |
| EP | 0447136 A2 | 9/1991 |

(Continued)

OTHER PUBLICATIONS

Public Works; "Lighting street lighting) (The 1996 Public Works Manuaul" (streets and Highways); Apr. 15, 1996; Dailog; pp. 1-7.*

(Continued)

*Primary Examiner* — Albert Decady
*Assistant Examiner* — Chad Rapp
(74) *Attorney, Agent, or Firm* — Stevens & Showalter LLP

(57) ABSTRACT

A controller is configured for and a corresponding method of adaptive monitoring and control of a lighting system are suited for adaptively establishing lighting parameters on a fixture by fixture basis. The controller includes a communication interface configured to communicate with a multiplicity of light fixtures, a memory for storing software routines and information associated with each of the light fixtures; and a processor coupled to the memory and the communication interface and configured to execute the software routines and selectively communicate with at least one of the multiplicity of light fixtures to adaptively establish lighting parameters for the at least one of the multiplicity of light fixtures. A method of facilitating the monitoring and control of the light fixture includes controlling a lamp circuit to provide one of a multiplicity of light levels; assessing performance parameters of the light fixture; and communicating with a central server.

40 Claims, 5 Drawing Sheets

U.S. PATENT DOCUMENTS

| | | | |
|---|---|---|---|
| 4,675,579 A | 6/1987 | Hardy et al. | |
| 4,731,551 A | 3/1988 | Gibbs et al. | |
| 4,777,607 A | 10/1988 | Maury et al. | |
| 4,931,701 A | 6/1990 | Carl | |
| 4,933,607 A | 6/1990 | Vogel | |
| 4,980,806 A * | 12/1990 | Taylor et al. | 362/85 |
| 4,994,718 A | 2/1991 | Gordin | |
| 5,004,957 A | 4/1991 | Cunningham | |
| 5,216,333 A | 6/1993 | Nuckolls et al. | |
| 5,235,252 A | 8/1993 | Blake | |
| 5,266,807 A | 11/1993 | Neiger | |
| 5,327,048 A | 7/1994 | Troy | |
| 5,336,976 A | 8/1994 | Webb et al. | |
| 5,406,176 A * | 4/1995 | Sugden | 315/292 |
| 5,451,843 A | 9/1995 | Kahn et al. | |
| 5,495,329 A | 2/1996 | Anderson, II et al. | |
| 5,701,058 A | 12/1997 | Roth | |
| 5,751,116 A | 5/1998 | Thomas et al. | |
| 5,902,994 A | 5/1999 | Lisson et al. | |
| 5,962,988 A | 10/1999 | Nuckolls et al. | |
| 5,962,991 A | 10/1999 | Levy | |
| 6,031,340 A | 2/2000 | Brosius | |
| 6,035,266 A | 3/2000 | Williams et al. | |
| 6,057,674 A | 5/2000 | Bangerter | |
| 6,114,816 A | 9/2000 | Nuckolls et al. | |
| 6,119,076 A | 9/2000 | Williams et al. | |
| 6,191,568 B1 | 2/2001 | Poletti | |
| 6,204,615 B1 | 3/2001 | Levy | |
| 6,316,923 B1 | 11/2001 | Poletti | |
| 6,337,001 B1 | 1/2002 | Haag et al. | |
| 6,359,555 B1 | 3/2002 | Willaims | |
| 6,370,489 B1 | 4/2002 | Williams et al. | |
| 6,393,381 B1 | 5/2002 | Williams et al. | |
| 6,393,382 B1 | 5/2002 | Williams et al. | |
| 6,415,245 B2 | 7/2002 | Williams et al. | |
| 6,441,565 B1 | 8/2002 | Levy | |
| 6,452,339 B1 | 9/2002 | Morissey et al. | |
| 6,456,373 B1 | 9/2002 | Wienecke et al. | |
| 6,456,960 B1 | 9/2002 | Williams et al. | |
| 6,498,440 B2 * | 12/2002 | Stam et al. | 315/291 |
| 6,548,967 B1 * | 4/2003 | Dowling et al. | 315/318 |
| 6,577,075 B2 | 6/2003 | Romano et al. | |
| 6,604,062 B2 | 8/2003 | Williams et al. | |
| 6,631,063 B2 | 10/2003 | Ortiz et al. | |
| 6,677,814 B2 | 1/2004 | Low et al. | |
| 6,704,301 B2 | 3/2004 | Chari et al. | |
| 6,714,895 B2 | 3/2004 | Williams et al. | |
| 6,791,284 B1 | 9/2004 | Levy | |
| 6,807,516 B2 | 10/2004 | Williams et al. | |
| 6,841,944 B2 | 1/2005 | Morissey et al. | |
| 6,856,101 B1 | 2/2005 | Hitchcock | |
| 6,889,174 B2 | 5/2005 | Williams et al. | |
| 6,892,168 B2 | 5/2005 | Williams et al. | |
| 6,956,336 B2 | 10/2005 | Ribarich | |
| 6,965,575 B2 | 11/2005 | Srikrishna et al. | |
| 7,034,466 B2 * | 4/2006 | Tsao | 315/88 |
| 7,045,968 B1 | 5/2006 | Bierman et al. | |
| 7,050,808 B2 | 5/2006 | Janusz et al. | |
| 7,168,822 B2 * | 1/2007 | Abramovich et al. | 362/249.07 |
| 7,355,726 B2 * | 4/2008 | Jeffers et al. | 356/614 |
| 7,653,010 B2 | 1/2010 | Ensor | |
| 2002/0062180 A1 | 5/2002 | Enberg | |
| 2002/0152045 A1 | 10/2002 | Dowling et al. | |
| 2003/0035460 A1 | 2/2003 | Tsikos et al. | |
| 2003/0098353 A1 | 5/2003 | Tskios et al. | |
| 2003/0132720 A1 | 7/2003 | El Bitar | |
| 2003/0155484 A1 | 8/2003 | Wiles | |
| 2004/0017158 A1 | 1/2004 | Ang et al. | |
| 2004/0105264 A1 * | 6/2004 | Spero | 362/276 |
| 2004/0130909 A1 | 7/2004 | Mueller et al. | |
| 2004/0204917 A1 | 10/2004 | Williams et al. | |
| 2004/0240208 A1 | 12/2004 | Beasley | |
| 2005/0035720 A1 | 2/2005 | Blake | |
| 2005/0054292 A1 | 3/2005 | Janusz et al. | |
| 2005/0253538 A1 * | 11/2005 | Shah et al. | 315/362 |
| 2006/0056331 A1 | 3/2006 | Ratiu et al. | |
| 2006/0056363 A1 | 3/2006 | Ratiu et al. | |
| 2007/0001833 A1 | 1/2007 | Sharma et al. | |
| 2007/0040513 A1 | 2/2007 | Cleland et al. | |
| 2007/0043541 A1 | 2/2007 | Cleland et al. | |
| 2007/0057807 A1 | 3/2007 | Walters et al. | |
| 2007/0282547 A1 * | 12/2007 | Howell et al. | 702/60 |
| 2009/0066258 A1 | 3/2009 | Cleland et al. | |
| 2009/0066540 A1 | 3/2009 | Marinakis et al. | |
| 2009/0072944 A1 | 3/2009 | Hayward | |
| 2011/0057570 A1 | 3/2011 | Cleland et al. | |
| 2011/0085322 A1 | 4/2011 | Myer | |

FOREIGN PATENT DOCUMENTS

| | | |
|---|---|---|
| EP | 0573323 A2 | 5/1993 |
| EP | 0669787 A1 | 2/1995 |
| GB | 2224589 A | 10/1988 |
| GB | 2213983 A | 8/1989 |
| GB | 2291993 A | 8/1995 |
| GB | 2345998 A | 7/2000 |
| GB | 2405263 A | 2/2005 |
| JP | 2003059678 | 2/2003 |
| WO | 8905536 | 6/1989 |
| WO | WO 92/16086 | 9/1992 |
| WO | WO 93/10591 | 5/1993 |
| WO | WO 98/02859 | 1/1998 |

OTHER PUBLICATIONS

Dorr et al; Effects of Power Line Voltage on Different Types of 400-W High Pressure Sodium Ballasts; IEEE 1997.

G. Miguel Ereu et al.; a Methodology to Determine Electrical Energy Consuption in Street Lighting Systems; IEEE 03/06.

Biegel, Ronald; Non-final Office Action in U.S. Appl. No. 11/899,841; Dec. 10, 2009; U.S. Patent and Trademark Office; Alexandria, VA.

Biegel, Ronald; Non-final Office Action in U.S. Appl. No. 11/899,841; Jul. 21, 2010; U.S. Patent and Trademark Office; Alexandria, VA.

Le, John; Non-final Office Action in U.S. Appl. No. 11/899,841; Jan. 3, 2011; U.S. Patent and Trademark Office; Alexandria, VA.

Le, John; Non-final Office Action in U.S. Appl. No. 11/899,841; Sep. 20, 2011; U.S. Patent and Trademark Office; Alexandria, VA.

Tang, Sigmund; Non-final Office Action in U.S. Appl. No. 12/231,929; Jun. 9, 2011; U.S. Patent and Trademark Office; Alexandria, VA.

Vu, David; Non-final Office Action in U.S. Appl. No. 12/946,768; Jun. 9, 2011; U.S. Patent and Trademark Office; Alexandria, VA.

Vu, David; Notice of Allowance in U.S. Appl. No. 12/946,768; Jan. 3, 2012; U.S. Patent and Trademark Office; Alexandria, VA.

Maicas, Jesus; Communication pursuant to Article 94(3) EPC; Application No. 06 752 830.7-2206; Nov. 2, 2011; European Patent Office; Germany; D2 Reference listed in Communication is GB 2345998 which published Jul. 26, 2000.

Le, John; Final Office Action in U.S. Appl. No. 11/899,841; Feb. 9, 2012; U.S. Patent and Trademark Office; Alexandria, VA.

* cited by examiner

ADAPTIVE ENERGY PERFORMANCE MONITORING AND CONTROL SYSTEM

RELATED APPLICATIONS

This application claims priority from Provisional Application, Ser. No. 60/695,252, filed on Jun. 30, 2005 and Provisional Application, Ser. No. 60/695,459, filed on Jun. 30, 2005, both of which are hereby incorporated herein in their entirety by reference.

FIELD OF THE INVENTION

This invention relates in general to control systems and more specifically adaptive monitoring and control of systems, such as lighting systems.

BACKGROUND OF THE INVENTION

Control and monitoring systems for systems such as lighting systems are known. Such systems can be used to turn light fixtures or luminaires on/off and monitor for basic performance, e.g., current drain, cycling conditions, number of on/off cycles and the like.

Lighting systems are often designed in accordance with standards established by the Illumination Engineering Society (IES) which is an international body of lighting engineers. The standards describe appropriate lighting levels or lumen output levels that a lighting system should provide. The light level or lumen output that is recommended by the IES varies in accordance with lighting applications, e.g., indoor, outdoor, playing field, parking lot, etc. For street lighting the standards consider type of roadway (residential, freeway, feeder or collector, etc) as well as activity level for both vehicles (possibly included in type of roadway) and pedestrians (referred to a pedestrian conflict level).

Lighting systems cover large geographic areas and consume large amounts of energy in the aggregate. The large geographic areas contribute to high maintenance costs since a technician often has to visit the location of each light fixture and these visits may need to be timed so the fixtures are operational (i.e., night time or off hours). Furthermore the large geographical areas can contribute to the impracticality of metering energy usage of individual or even sets of fixtures, thus resulting typically in estimating usage.

Lighting systems and constituent components of light fixtures have a life expectancy and operate differently with differing output light levels or lumens over that life time. Lighting engineers realize this and typically over design systems such that they are producing lumen outputs well in excess of the recommended levels during much of their life expectancy and appropriate levels only during later phases of their life expectancy. This further contributes to large and often excessive energy consumption.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
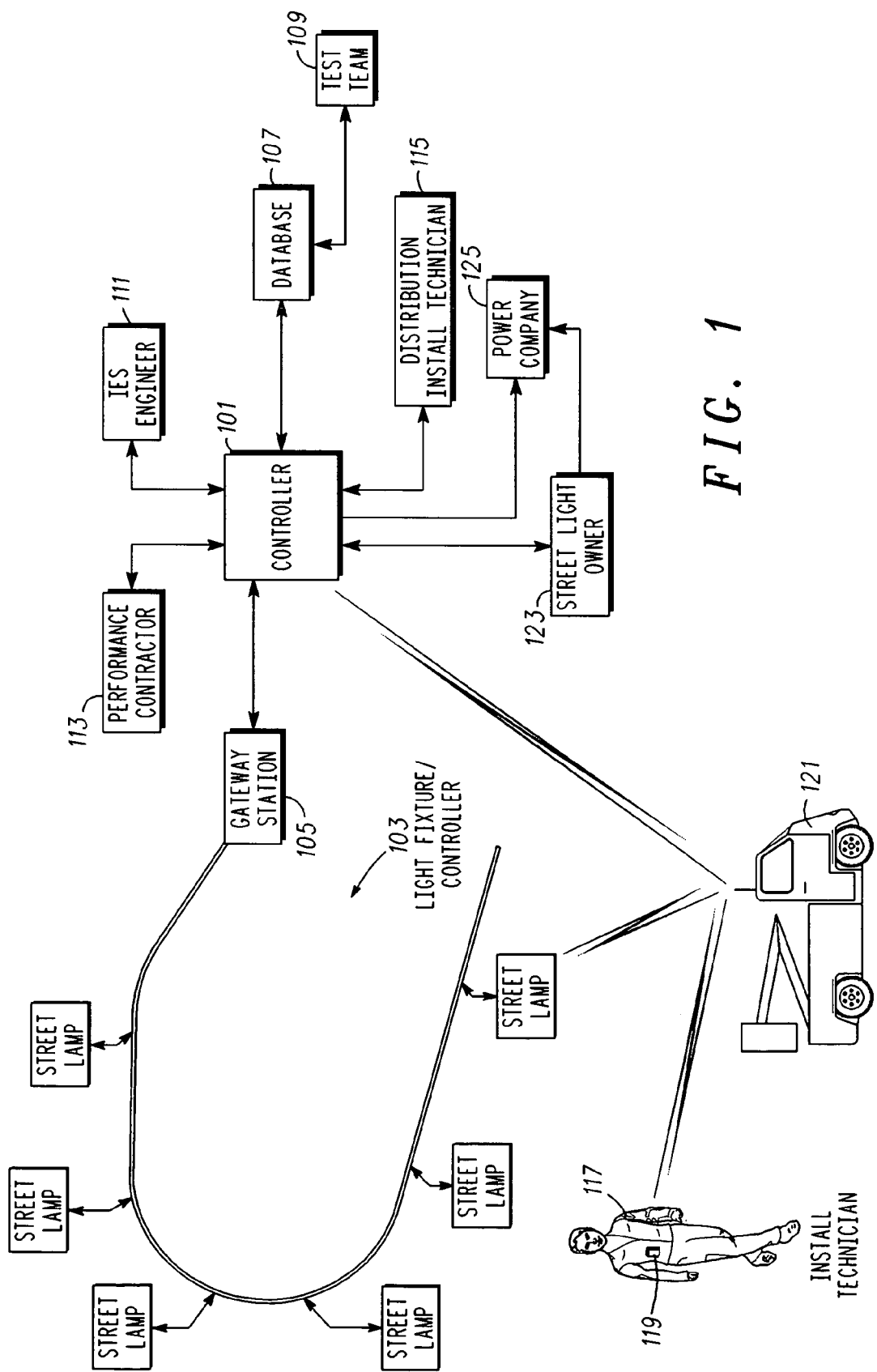
FIG. 1 depicts in a simplified and representative form, a high level system diagram with various entities or stakeholders in accordance with one or more embodiments.

In overview, the present disclosure concerns adaptively controlling and monitoring systems, e.g., lighting systems, pursuant for example, to saving energy and maintenance costs. The systems, controllers, methods and the like discussed and described provide for entity by entity, e.g., light fixture by light fixture, control and monitoring where the control and monitoring are performed in a manner that is adaptive to the specifics of the entity, e.g. light fixture. More specifically techniques and apparatus for controlling light fixtures, such as used in street lighting or other lighting systems so that the fixtures or luminaires provide accurately controlled and specified light levels over the life expectancy of each light fixture are described and discussed.

The systems of particular interest may vary widely but include outdoor and indoor lighting systems or any other system where ambient or generated light levels and accurate control and monitoring thereof on a fixture by fixture basis can be advantageously used to enhance and improve energy consumption and thus costs including externalities (e.g., global warming) of these systems. In systems, equipment and devices that are suited for adaptive control and monitoring, e.g., street lighting or other lighting systems, a central controller and database can be particularly advantageously utilized to provide accurate light levels and timely maintenance information on a fixture by fixture basis, provided they are practiced in accordance with the inventive concepts and principles as taught herein.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in integrated circuits (ICs) including possibly application specific ICs or ICs with integrated processing controlled by embedded software or firmware. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts of the various embodiments.

Referring to FIG. 1, a simplified and representative high level system diagram with various entities or stakeholders in accordance with one or more embodiments will be briefly discussed and described. FIG. 1, shows a controller 101 configured for communication with a multiplicity of light fixtures 103 and associated light fixture controllers via a plurality of gateways 105 or lumen stations (one shown). Generally a lighting system would have multiple gateways with each providing a communication path or link to a group of light fixtures. The communication path or link to the light fixtures can be wired (phone line, power line, fiber optic, etc.) or can be wireless (short range unlicensed, cellular based, satellite, mesh network, etc.) and different gateways can use different wired or wireless communication paths or links. Generally these communication paths or links do not handle large volumes of data and the communication needs are not highly time critical and therefore a wide variety of technologies can be used to support the links or paths. The other links or paths indicated, e.g., gateway to controller, are generally paths between limited numbers of fixed location equipment and typically will be wired paths, e.g., telephone or cable company based paths, although suitable wireless paths may be used.

The controller further comprises or has access to a database 107 where the database includes information corresponding to each light fixture or luminaire. This information includes fixture by fixture configuration information, e.g., ballast, capacitor, bulb types, a luminance profile table with light or lumen output levels and power or energy consumption information for each lumen output level, log files for status information and the like as reported by the fixture, and various other fixture by fixture information.

FIG. 1 also illustrates various entities or actors that may desire or need access to various portions of the controller, system, or database during system development, deployment, or operation. Typically this access is required during deployment as a light fixture is fitted or re-fitted with a light fixture controller and configured to operate with the system discussed and described herein. For example, a testing team 109 needs access to the database to load energy or luminance or power profile tables. Generally the test teams characterizes each possible ballast circuit to provide a table (luminance or power profile table) that cross references output lumen level versus power consumption and a lighting level indication for a multiplicity of lighting level indications and thus expected light or lumen levels, e.g., 64 levels in one embodiment. The power profile table in addition to Ballast specification (from Manufacturer) and capacitor specification that matches the Ballast are part of an ACD (approved components database) which is a portion of an Inventory module included with the database. A given light fixture will be associated with one of the luminance profile tables, etc.

An IES or lighting engineer 111 needs access to the system and database for loading or changing targeted lumen output values (energy profiles) on a fixture by fixture basis. These changes can result from a system evaluation or changes in surfaces, roadway types or activity levels and the like that can be fixture specific. Typically this energy or output profile will be a function of time of day and possibly seasonally dependent as well. For example, higher lumen output is desired during peak traffic periods while early morning periods, e.g., 1 AM to 5 AM, suggest a much lower output is appropriate. Furthermore Saturdays may vary from Mondays, etc. Similarly, the contractor 113 in charge of system deployment and maintenance will likely need access from time to time. The technician 115 in charge of integrating the light fixture controller into a luminaire or light fixture housing will need access to the inventory module and approved components database as well as access to load the specific components (Ballast, Capacitor, lamp) used for a specific fixture.

Technicians 117 in the field and responsible for actual deployment of the light fixture and associated light fixture controller, will need access as light fixtures are installed for recording set up information including geographic location, etc. As shown the technician is provided a handheld unit 119 (Lumen Conductor) that can be used for appropriate data confirmation and entry (e.g., ground level lumen level, deployment dates, equipment configuration, etc.). In one embodiment a lift truck 121 equipped with a local radio transceiver can be used to facilitate access of the portable equipment and prospective light fixture to the controller 101 and database 107. It will be appreciated that the portable unit can be loaded with proper information and later used to facilitate a download of this information via a wired interface to the controller and database, etc.

Other actors include the system owner or owner's representative 123 who will have access to the system controller and database to obtain various reports (energy consumption reports, energy or lighting profile changes, maintenance information, etc.) and load configuration data (equipment components, etc.) or provide approval for data that is loaded. Additionally it is expected that the Company (electric utility) that provides power for the system will be given access to energy consumption or profile information, i.e., information to facilitate consumption based metering.

Figure 2:
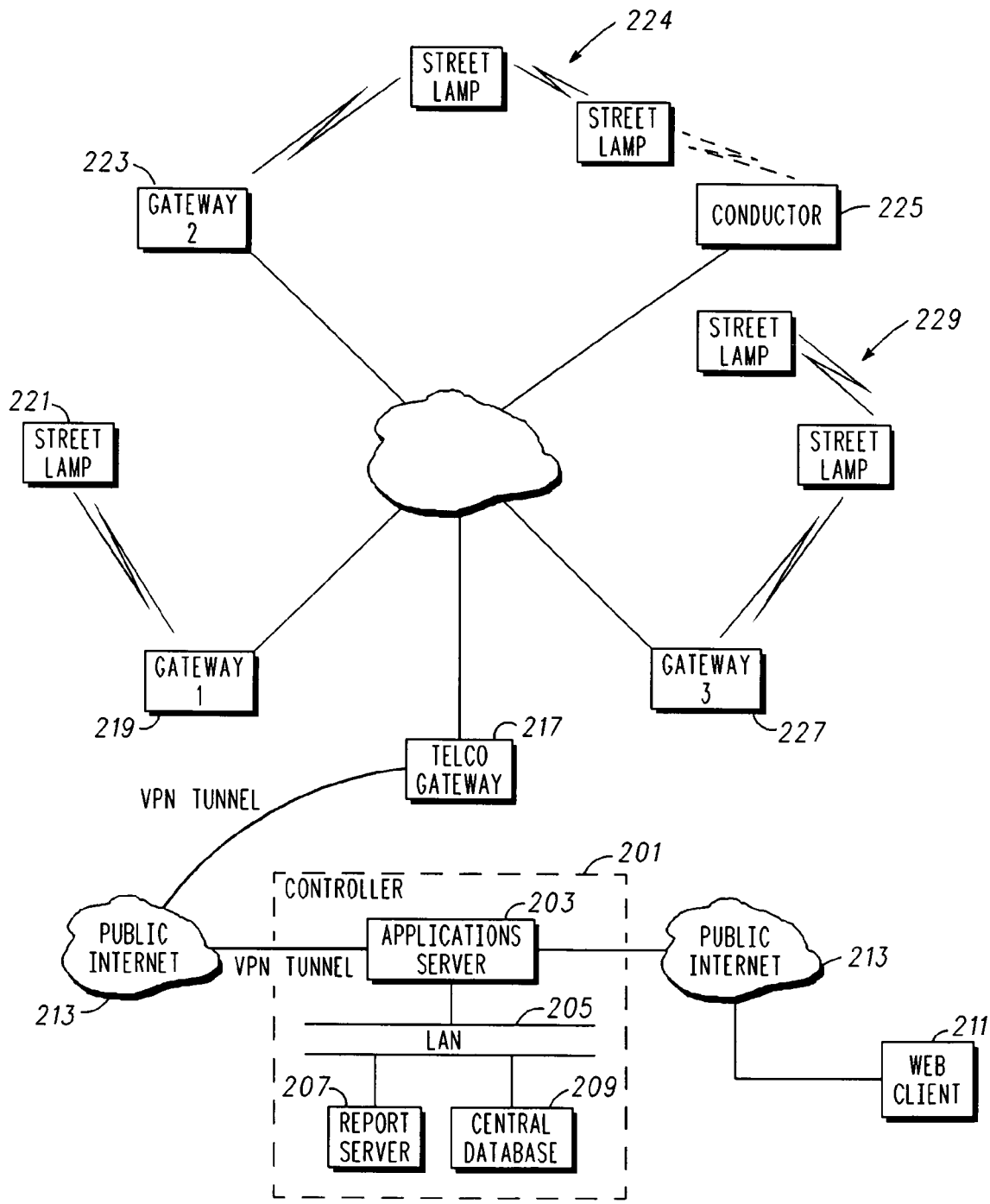
FIG. 2 in a representative form, shows a system diagram indicative of a physical embodiment for a lighting system with adaptive control and monitoring in accordance with one or more embodiments.

Referring to FIG. 2, a representative system diagram indicative of a physical embodiment for a lighting system with adaptive control and monitoring in accordance with one or more embodiments will be briefly discussed and described. FIG. 2 shows a system level diagram of one physical embodiment of a lighting system. The lighting system of FIG. 2 shows a controller 201 which is in relative part functionally similar to the controller 101 of FIG. 1. In FIG. 2 the controller or system controller 201 is shown in a distributed embodiment including a system or application server 203 intercoupled via a local area network (LAN) 205 to a report server 207 and central database 209. The report server has access to the central database and can be utilized to provide various reports (energy consumption, performance and maintenance and the like). The respective servers are commercially available and can utilize general purpose computers available from, e.g., Dell, Hewlett Packard, Sun, etc.

The controller 201 is shown coupled via the Internet (World Wide Web, etc.) 213 to one or more clients 211 (remote computers and the like) that provide external web access to the controller, etc. The controller is also coupled via a communication interface and the Internet 213, e.g., via a virtual private network (VPN) tunnel, telephone gateway, etc. to a multiplicity of light fixtures, e.g., street lights. Specifically the controller 201 is shown coupled to and communicating with the light fixtures via one or more gateways or lumen stations, i.e., gateway 219 is coupled via a wireless link to light fixtures (one shown) 221, gateway 223 is shown coupled to light fixtures 224, and gateway 227 is coupled to light fixtures 229. Note that the gateways 221, 223, 225 can be viewed as part of the system controller as they can play an integral part in the management and adaptive control and monitoring for the overall system or street lighting system. The gateways are depicted as supporting a communication path or link (wireless link in this embodiment) to the light fixtures and among other duties aggregate data from light fixtures, i.e., associated light fixture controllers, and forward this data or information to the system controller and database. The gateways also allow the controller to communicate information suitable to establish lighting parameters, e.g., schedules (times, lumen levels, etc.) and the like and request log files, etc. from individual light fixture controllers. Further shown in FIG. 2 is a handheld device (conductor) 225, functionally similar to the device of FIG. 1, which may be configured to communicate via a wireless link with a particular light fixture controller as shown.

Figure 3:
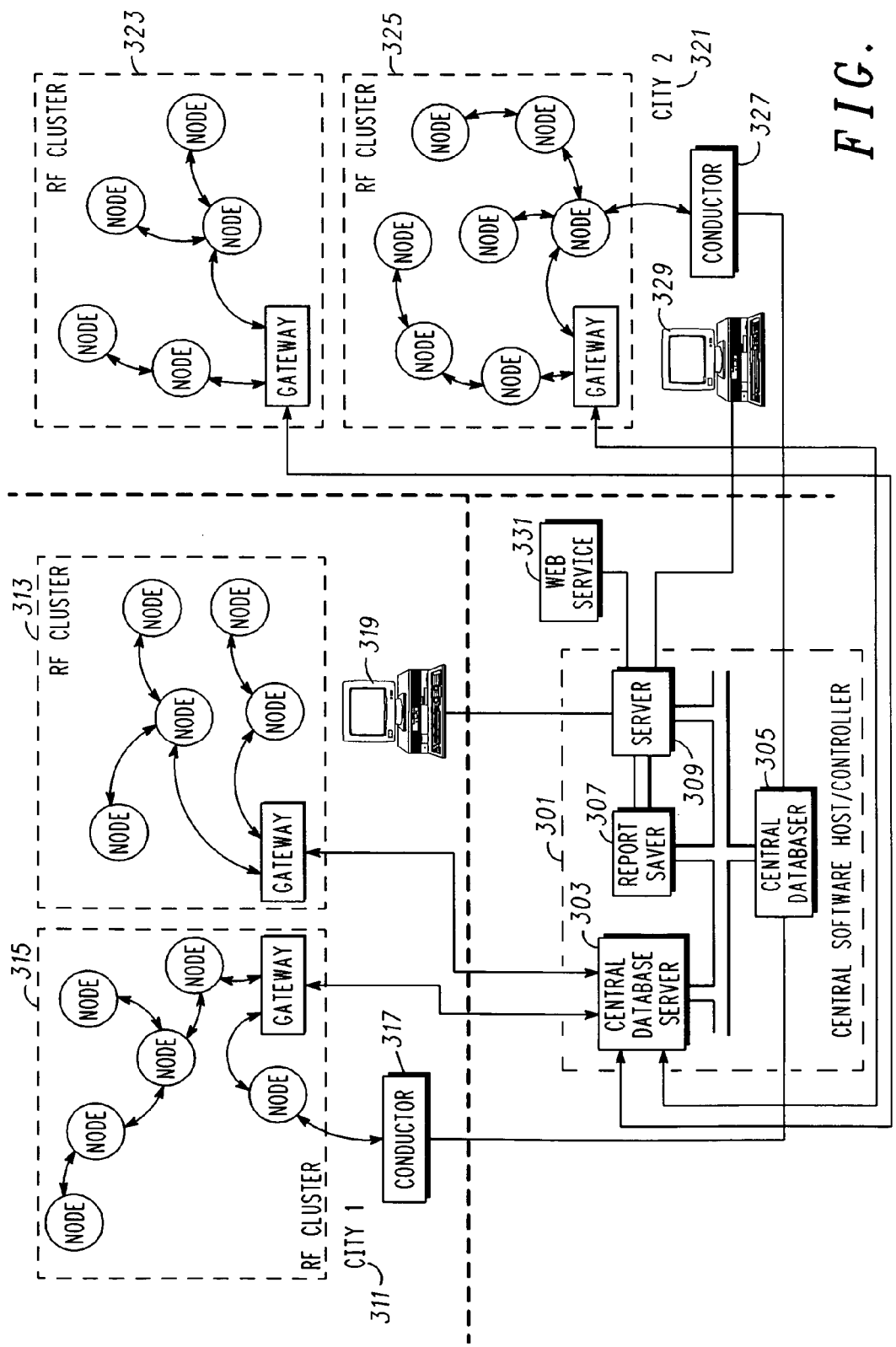
FIG. 3 in a representative form, shows a system diagram illustrating logical relationships in an extended lighting system in accordance with one or more embodiments.

Referring to FIG. 3, a representative system diagram illustrating logical relationships in another embodiment of an extended lighting system in accordance with one or more embodiments will be discussed and described. FIG. 3 shows a controller 301 and central software hosting environment comprising a central system server 303, central database 305, report server 307 and communication and application server 309. It will be appreciated that these servers can be a distributed computer network or one or more of the servers can be performed by one computer installation. Each of these servers is intercoupled with the others and the database 305 via in one embodiment a LAN. The controller 301 is coupled to a lighting system that is spread over two cities.

City 1 311 is comprised of a plurality of clusters (two shown) 313, 315 with each comprising a gateway and multiplicity of nodes where each node typically corresponds to or is associated with a light fixture, e.g., street light or luminaire. The nodes are organized in the embodiment of FIG. 3 in a mesh network wherein one node may operate as a relay site to assist with or support a communication path from another node to the gateway. A conductor 317 and Web client 319 associated with city 1 311 is also depicted. City 2 321 is similar to city 1 as depicted and is comprised of a plurality of clusters (two shown) 323, 325 with each comprising a gateway and multiplicity of nodes where each node typically corresponds to or is associated with a light fixture, e.g., street light or luminaire. The nodes are organized in the embodiment of FIG. 3 in a mesh network wherein one node may operate as a relay site to assist with or support a communication path from another node to the gateway. A conductor 327 and Web client 329 associated with city 2 311 is also depicted. It will be appreciated that the different cities can be different states or provinces or different countries. It will also be appreciated that different clusters can be organized in a fashion other than a mesh network or use communication links other than wireless links.

The gateways or stations of FIG. 3 as well as FIGS. 1 and 2 may be considered to be part of a controller or system controller. The gateways can be coupled to the central or system controller via a wired or wireless link or path. In various embodiments, the functionality of the gateways include supporting the communication interface between the system controller 301 and the multiplicity of light fixtures, e.g., luminaires. This includes the interface between the gateway and light fixtures (routing tables and the like) and the interface between the gateway and system controller. The gateways can be instrumental in firmware upgrades for light fixture controllers including programming any configuration parameters. The gateways can get light fixture controller states, capacitance levels (light output settings, collect error and operational logs, maintenance logs and the like and upload them to the central controller and database, as well as transfer other lighting parameters, e.g., schedules and lighting levels to the individual fixture controllers.

The nodes or light fixture controllers support the communication link to the associated gateway, maintain error condition and other historical data logs, provide cycling protection for the associated lamp, maintain a minimum required light output level in accordance with a schedule and any lamp, ballast, etc depreciation (degradation), dirt build up and the like as sensed by a lamp output level sensor. This controller turns the lamp OFF or ON at an appropriate or designated light level and changes the level to account for degradation or depreciation and records data that is sufficient to determine power consumption and passes the data to the system controller.

Figure 4:
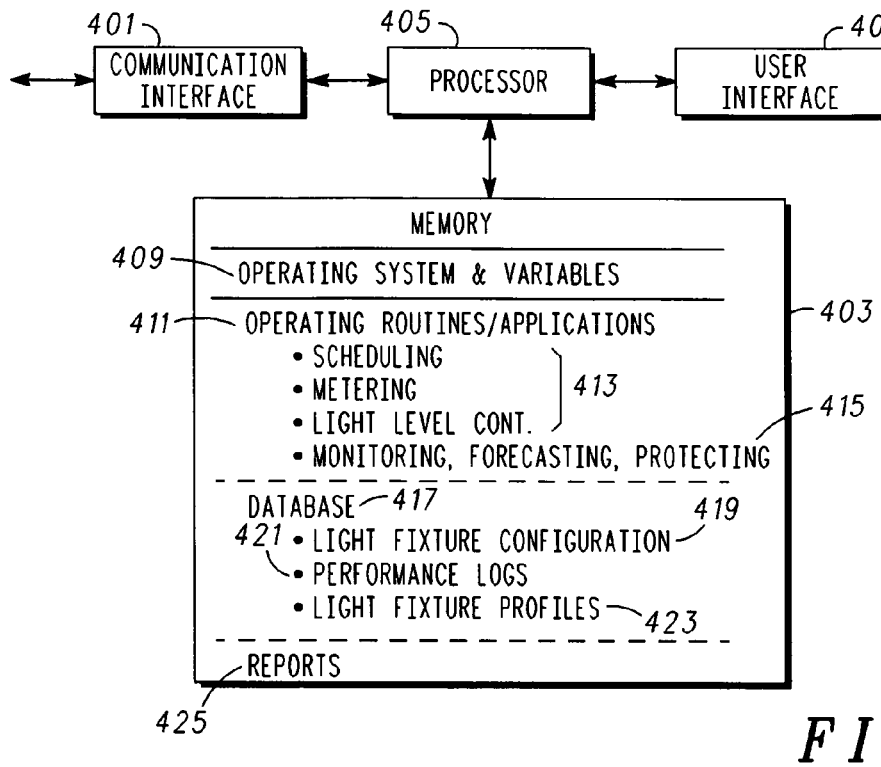
FIG. 4 in a representative form, shows a high level block diagram of a controller configured for adaptive monitoring and control of a lighting system in accordance with one or more embodiments.

Referring to FIG. 4, a representative high level block diagram of a controller, e.g., similar to controller 101, 201, 301 or the like, which is configured for adaptive monitoring and control of a lighting system in accordance with one or more embodiments will be discussed and described. FIG. 4 shows a controller configured for adaptive monitoring and control of a system, e.g., a lighting system. The controller comprises a communication interface 401 that is configured to communicate with a multiplicity of light fixtures either directly or indirectly as noted above. It will be appreciated that various protocols, e.g., IP protocols (TCP, etc.) can be utilized for communications via the communication interface. The controller further comprises a memory 403 that is configured for storing software routines and information associated with each of the multiplicity of light fixtures. The memory can be any combination of known memory technology including magnetic, optical, solid state, etc.

Additionally included in the controller is a processor 405 that is coupled to the memory and the communication interface and that is configured to execute various of the software routines and selectively communicate with at least one or more of the multiplicity of light fixtures to adaptively establish lighting parameters for the at least one of the multiplicity of light fixtures. Also shown is a user interface 407 which functions in various manners as is generally known and may be located at the same site or a remote site with respect to the controller.

The memory 403 includes or stores an operating system and variables 409 that as will be generally appreciated is suitable for instructing the controller to perform its respective duties. Further included are various operating routines and applications 411. These routines or applications include software instructions 413 that are directed to scheduling respective light fixtures, consumption metering for light fixtures, and controlling light levels for individual light fixtures or one or more groups of light fixtures. Additionally shown are routines 415 that are focused on monitoring light fixtures (collecting performance and error data), forecasting light fixture performance and maintenance activities, and protecting respective light fixtures, e.g., from over cycling or over temperature conditions, and system functions.

Additionally included in the memory 403 is a database 417. The database includes light fixture configuration information 419 which indicates what components are used by each light fixture as well as a centralized approved components (ballast, capacitor, lamp, etc.) database. Additionally shown are performance logs 421 that are collected from each light fixture and provide an indication of times when lamp is on, light output levels, temperatures, errors, etc. Furthermore, the database includes light or energy profile tables 423. These tables show for each output setting, e.g., up to 64 settings, expected lumen output levels and energy input levels for each configuration of ballast, capacitor, lamp, etc that has been evaluated over a selection of, e.g., 64 capacitance values. A particular light fixture will be associated with a particular one of the tables 423. Generally if a particular lumen or light output level is desired an output setting or lumen indication, i.e., level from 0 to 63 can be selected and provided to a given light fixture. In some embodiments the light fixture or associated fixture controller can set the fixture to the indicated level, measure via a light or lamp sensor the actual output level, and modify the setting to obtain the desired level. In other embodiments the actual lumen output level is measured and reported and based on the measured level the indicated level can be adjusted up or down to obtain the targeted output level.

Also included is a reports application that is configured to provide reports regarding, e.g., energy consumption for selected light fixtures or sets of fixtures over selected period of time. Other reports include maintenance reports, either actual or prospective. Other examples of reports include performance monitoring reports, component failure reports, custom reports resulting from filtering configuration, performance, or failure data or the like. For example, a report focused on light fixtures with particular components for a particular section of a roadway for a particular time period and particular performance parameter, e.g. lamp cycling, could be formed using a custom reporting application.

The lighting parameters referred to above can be adaptively established in terms of a lighting application (roadway, parking lot, etc.), the particulars of the light fixtures (ballast, capacitor, lamp, etc.), age of the fixture or one or more constituent components, performance history and current or targeted performance, etc., etc. In general, the lighting parameters are adapted to or tailored or customized in view of the light fixture, its environment, or other particulars. For example, the processor can be configured to adaptively establish lighting parameters for the at least one or more or each of the multiplicity of light fixtures based on lighting information corresponding, respectively, to the one or more of the multiplicity of light fixtures.

The lighting information can be obtained from the memory 403 and include or be dependent on a lighting schedule (days, times, output level as a function of the day and time) and the like or past lighting or lumen output levels for the particular light fixture or targeted light output levels as stored in the memory. The processor can adaptively establish lighting parameters for at least one or more and possibly each of the multiplicity of light fixtures based on lighting status information obtained from the corresponding one or each of the multiplicity of light fixtures. In various embodiments, the processor can be configured to adaptively establish a lighting level for and based on lighting status information obtained from at least one of the multiplicity of light fixtures, where the lighting status information corresponds to the information in the memory associated with the at least one of the multiplicity of light fixtures.

Thus, the controller, specifically processor 405 can adaptively establish different lighting parameters for one versus a different one of the multiplicity of light fixtures based on different lighting information associated with one versus the different one of the multiplicity of light fixtures. In summary, using the controller of FIG. 4, etc. allows a system or lighting system to set light levels that are provided by each light fixture so that just enough or a minimum acceptable light or lumen level is being provided for the circumstances associated with each corresponding light fixture over the service life or lifetime of the lighting fixture. This is in sharp contrast to known practices of over designing and over lighting a given surface knowing that degradation or depreciation of light fixtures over the life of the fixtures or components will result in just enough lumen output in the later stages of the life cycle for a fixture. By providing just enough light output from each light fixture, rather than an excess amount of lighting for most of the fixture life cycle, significant energy savings are realized. Similarly life cycles or lifetimes for some light fixtures can be extended when they are operated at lower output levels, thereby realizing savings in maintenance costs.

As indicated above, the controller, specifically the communication interface can comprise in total or in part a wireless interface to some or all of the multiplicity of light fixtures. The wireless interface can be an adhoc interface in accordance with various IEEE 802 standards, a cellular interface, or other low power unlicensed interface. The wireless interface can rely on terrestrial based infrastructure or possibly take advantage of a satellite system. In one embodiment, the wireless interface comprises a wireless network configured as a mesh network that is comprised of a plurality of transceivers associated with a corresponding plurality of the multiplicity of light fixtures where the transceivers can operate as relay stations to insure that a communication path exists between each transceiver and the controller. In other embodiments, the communication interface further comprises in whole or in part a wired interface to the multiplicity of light fixtures and may take advantage of communication links using power lines, telephone lines, fiber optic cables, or the like. The communication interface can provide a communication link to one or more gateways, where each gateway provides a communication link to one or more of the multiplicity of light fixtures.

Various embodiments of the controller, specifically the processor 405 are further configured to selectively communicate with at least one or more or each of the multiplicity of light fixtures to adaptively establish lighting levels for one or more of the multiplicity of light fixtures, where the lighting levels are based on a schedule for the respective ones of the multiplicity of light fixtures. Where the light fixtures or luminaires have the ability to vary the light output levels over a multiplicity of output levels, the controller or processor can vary the lighting levels over three or more levels in accordance with a time of day, i.e., OFF, ON at a high level during peak traffic periods, and ON at a lower light output level during non peak traffic or activity periods, e.g., early AM hours. The lighting levels can correspond to a lighting application, e.g., streets or roads, parking lot, stadium lighting system, indoor or outdoor, etc. The lighting levels can vary in accordance with or vary to correspond to a type of surface to be illuminated (freeway, city, residential) or to correspond to an activity level (vehicular or pedestrian) associated with a type of surface to be illuminated. The lighting levels can correspond to or be controlled to correspond to one or more weather conditions, i.e., when adverse weather conditions (snow, rain, etc) are present in a given location, lumen or lighting output levels can be increased in those areas.

In one or more embodiments, the controller, specifically the processor via the communications interface can control individual light fixtures such that the lighting levels correspond to an age of one or more components associated with each of the multiplicity of light fixtures. In particular the lighting levels can be compensated by indicating a higher light output value as the light fixture or constituent components age and thus the lighting level as provided by a light fixture is compensated for the age (held nearly constant) and thus depreciation or degradation of the fixture or components. The lighting levels can be controlled in accordance with or to correspond to performance information obtained from each of the multiplicity of light fixtures.

In various embodiments, the controller or the processor is configured to selectively communicate with each or one or more of the multiplicity of light fixtures to obtain performance related information associated with the respective one of the multiplicity of light fixtures. For example, the processor is configured to obtain performance information sufficient to determine power consumption of the respective ones of the multiplicity of light fixtures, i.e., input power and number of hours at each input power level. Additional performance related information or other data regarding various components, etc. can be collected or captured in real time for later or as required analysis, e.g., for predictive purposes and the like.

Figure 5:
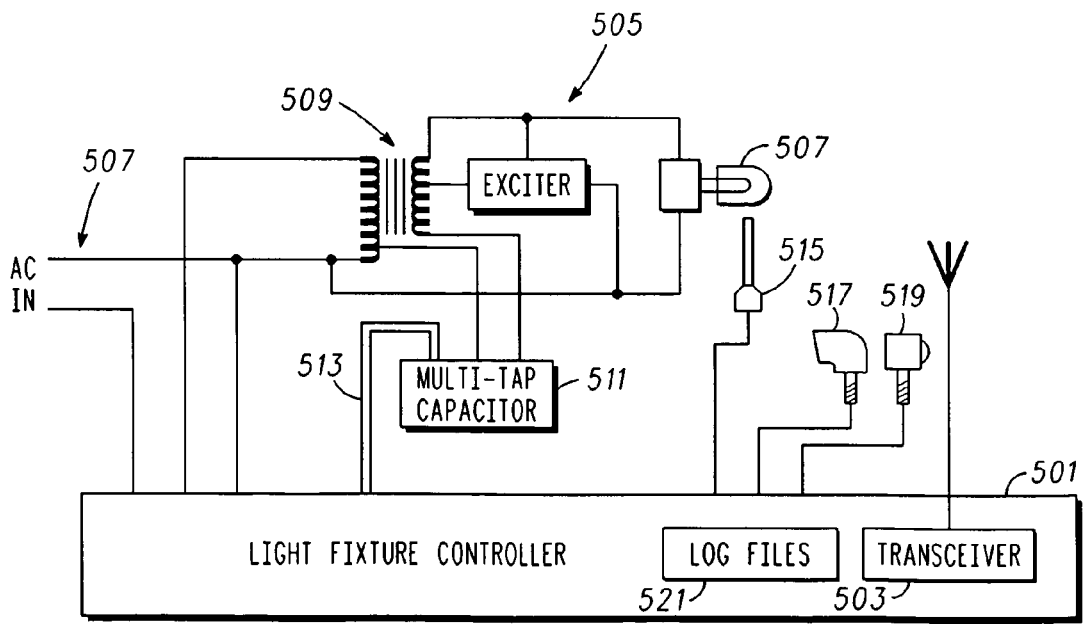
FIG. 5 illustrates a representative embodiment of a light fixture controller in a light fixture for use in the systems of FIG. 1-FIG. 3 in accordance with one or more embodiments.

Referring to FIG. 5 a representative embodiment of a light fixture controller in a light fixture for use in the systems of FIG. 1-FIG. 3, in accordance with one or more embodiments will be briefly discussed and described. FIG. 5 shows a light fixture controller 501 that includes memory with log files, etc. 501 and a transceiver 503 to support a wireless link, e.g., to a gateway. The log files include information regarding lamp ON/OFF, any cycling events and cycle limit exceeded, temperature information, light levels as measured, service and reset data, lamp sensor light level and temperature value at defined intervals, day night sensor data, real time clock information, etc.

A lamp circuit 505 that is powered along with the controller from AC power input 507 is depicted. The lamp circuit 505 includes a lamp 507, e.g., in some embodiments a High Intensity Discharge (HID) lamp, a Ballast circuit 509 (shown as coiled core but could be electronic) and a multi-tap capacitor 511. Different capacitor values can be selected and switched into the Ballast circuit 509 and this provides for selecting different input power levels and thus output lumen levels from the lamp 507. It will be appreciated that other selecting means would be used for electronic ballasts. The controller determines or is provided a power level indication, e.g., one of 64 levels, that is desired and controls a switch circuit (not shown) coupled to the capacitor by bus 512 to select an appropriate capacitance to provide the indicated power level.

Also shown in FIG. 5 is a lamp sensor 515 that includes a temperature sensor (not shown), a day night sensor 517, and one or more other sensors 519, e.g., activity (motion) sensor, dust sensors, etc. The day night sensor is suited for detecting dawn and dusk (night and day) lighting conditions and can be used by the controller to turn the lamp on and off. Alternatively a command via the transceiver from a system controller can be used to turn the lamp on and off. The lamp sensor includes a photo sensor and is arranged and configured with the controller to measure and indicate an actual light output level from the lamp. The output level as measured can be compared to the expected or targeted light output level. The light fixture controller can adjust the via changing capacitance the output level up or down to provide the appropriate output lumen or light level. Alternatively or additionally the actual light output level can be reported via the transceiver to the system controller or the like. The system controller can then make adjustments to the indicated power level in the appropriate direction and send another command to the fixture controller. In any event the lamp sensor and actual light level that is measured and feedback allows the light fixture to be operated at the minimum appropriate light level.

In operation the light fixture or lumen controller 501 or other apparatus with similar functionality can be used to implement a method of facilitating monitoring and controlling a light fixture. The method as will be evident from the discussions above includes controlling a lamp circuit to provide one of a multiplicity of light levels; assessing performance parameters of the light fixture (light output, temperature, ON OFF conditions, hours of usage at each power level, etc); and communicating with a central server. The communicating with a central server further comprises sending one or more of the performance parameters to the central server or receiving lighting parameters (schedules, levels, etc.) from the central server and the controlling the lamp circuit can be performed responsive to the lighting parameters. As noted the controlling a lamp circuit to provide one of a multiplicity of light levels is responsive and adapted to the assessing performance parameters including measuring an output light level. The controlling a lamp circuit can comprise controlling the light circuit to change an actual output light level to approach a target output light level. The target output light level is normally obtained by communicating with the central server. It will be appreciated that one or more of these processes can be repeated as required.

Figure 6:
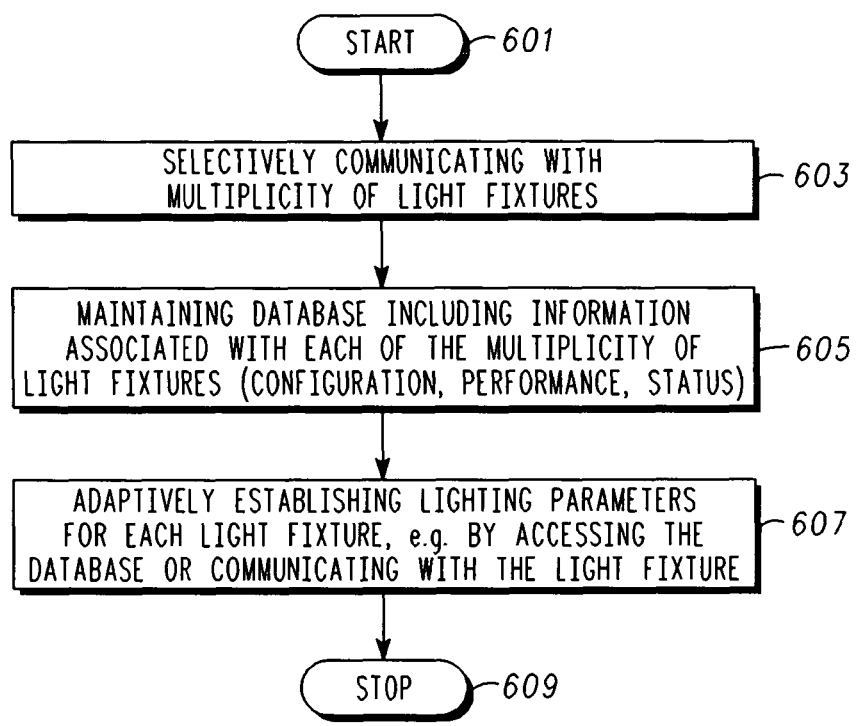
FIG. 6 shows a flow chart illustrating one or more methods of adaptively monitoring and controlling a lighting system in accordance with one or more embodiments.

Referring to FIG. 6, a flow chart illustrating one or more methods of adaptively monitoring and controlling a lighting system in accordance with one or more embodiments will be discussed and described. FIG. 6 shows a flow chart 600 that starts at 601 and that reflects methods associated with and of adaptively monitoring and controlling a lighting system. These methods can be implemented with the controller of FIG. 1-FIG. 4 or other similar apparatus with similar functionality. Many of the inventive techniques and principles reflected in the flow chart and these discussions have been discussed above and thus much of the discussion below will be a summary format with various details available above.

One embodiment is a method comprising selectively communicating with each of a multiplicity of light fixtures 603 and maintaining a data base containing information associated with each of the multiplicity of light fixtures 605. The selectively communicating can include sending information (schedules, etc.) to the respective light fixtures as well as receiving information from these fixtures. The method further comprises adaptively establishing lighting parameters 607 for each of the multiplicity of light fixtures by the selectively communicating with each of the multiplicity of light fixtures and further based for example on respective information in the database.

The maintaining the database can include maintaining a data base including configuration information for each of the multiplicity of light fixtures and including information obtained by the selectively communicating with each of the multiplicity of light fixtures to obtain, e.g., performance related information associated with each of the multiplicity of light fixtures. For example, maintaining a data base can include obtaining performance information sufficient to determine power consumption of each of the multiplicity of light fixtures, pursuant to consumption based metering. Furthermore, maintaining a data base can comprise maintaining a database including behavior of one or more components associated with each of the multiplicity of light fixtures.

The adaptively establishing lighting parameters in some embodiments further comprises adaptively establishing lighting parameters (levels, schedules, etc.) for each of the multiplicity of light fixtures based on lighting status information corresponding to the each of the multiplicity of light fixtures. For example, the adaptively establishing lighting parameters for the each of the multiplicity of light fixtures can be based on lighting status information obtained from each of the multiplicity of light fixtures. The adaptively establishing lighting parameters for each of the multiplicity of light fixtures based on lighting status information can comprise establishing a respective lighting level for and based on lighting status information obtained from each of the multiplicity of light fixtures, where the lighting status information corresponds to the information in the database associated with each of the multiplicity of light fixtures. As noted above, the adaptively establishing further comprises establishing different lighting parameters for a first and a second one or different ones of the multiplicity of light fixtures based on different lighting status information associated with the first and the second one of the multiplicity of light fixtures.

The selectively communicating can comprise selectively communicating over a wireless or wired or some combination of wired and wireless interface to the multiplicity of light fixtures. The selectively communicating often includes selectively communicating over one or more gateways, where each gateway provides a communication link to one or more of the multiplicity of light fixtures. The selectively communicating in various embodiments comprises selectively communicating with one or more or each of the multiplicity of light fixtures to adaptively establish lighting levels for the respective ones of the multiplicity of light fixtures, where the lighting levels are based on a schedule for the respective ones of the multiplicity of light fixtures. For example, the lighting levels for any one or more of the multiplicity of light fixtures can vary over three or more levels in accordance with a time of day.

The lighting levels can be adaptively controlled on a fixture by fixture basis to correspond to one or more of a lighting application, a surface to be illuminated, an activity level associated with the surface to be illuminated or environmental conditions (adverse weather, dust storms, etc.) in the location of respective ones of the multiplicity of light fixtures. The lighting levels can be adaptively controlled to correspond to an age of one or more components associated with each of the multiplicity of light fixtures. Specifically, in various embodiments, the lighting levels are adaptively controlled on a fixture by fixture basis to correspond to measured output light level information obtained from each of the multiplicity of light fixtures.

The processes, apparatus, and systems, discussed above, and the inventive principles thereof are intended to and can significantly reduce energy usage and lower maintenance costs of lighting systems and the like. Using the techniques noted, including feedback from respective light fixtures, light output levels can be controlled or set at a minimum acceptable output level (rather than the present practice of over lighting to account for life time depreciation effects) and maintained at that level over a life cycle of the light fixture.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A controller configured for adaptive monitoring and control of a lighting system, the controller comprising:
    a communication interface configured to communicate with a multiplicity of geographically distributed light fixtures, the multiplicity of geographically distributed light fixtures operable to provide general lumination to a geographical area;
    a memory for storing software routines and information associated with each of the multiplicity of geographically distributed light fixtures, wherein a portion of the information is obtained, via the communication interface, from the each of the multiplicity of geographically distributed light fixtures; and
    a processor coupled to the memory and the communication interface, and configured to execute the software routines and selectively communicate with each of the multiplicity of geographically distributed light fixtures to adaptively establish lighting parameters for each of the multiplicity of geographically distributed light fixtures based on lighting information corresponding to the light fixture,
    wherein the processor is further configured to adaptively establish different lighting parameters for at least a different one of the multiplicity of geographically distributed light fixtures based on different lighting information associated with the at least a different one of the multiplicity of geographically distributed light fixtures, the lighting parameters establish a lighting level that is compensated for degradation of one or more components of the at least one of the multiplicity of geographically distributed light fixtures.

2. The controller of claim 1 where the processor is further configured to adaptively establish lighting parameters for the at least one of the multiplicity of light fixtures based on lighting status information obtained from the at least one of the multiplicity of light fixtures.

3. The controller of claim 1 where the processor is further configured to adaptively establish the lighting level for and based on lighting status information obtained from the at least one of the multiplicity of light fixtures, where the lighting status information corresponds to the information associated with the at least one of the multiplicity of light fixtures.

4. The controller of claim 1 where the communication interface further comprises a wireless interface to the multiplicity of light fixtures.

5. The controller of claim 4 where the wireless interface further comprises a wireless network configured as a mesh network comprised of a plurality of transceivers associated with a corresponding plurality of the multiplicity of light fixtures.

6. The controller of claim 1 where the communication interface further comprises a wired interface to the multiplicity of light fixtures.

7. The controller of claim 1 where the communication interface provides a communication link to one or more gateways, where each gateway provides a communication link to one or more of the multiplicity of light fixtures.

8. The controller of claim 1 where the processor is further configured to selectively communicate with at least one of the multiplicity of light fixtures to adaptively establish the lighting level for the at least one of the multiplicity of light fixtures, where the lighting level is based on a schedule for the at least one of the multiplicity of light fixtures.

9. The controller of claim 8 where the lighting level varies over three or more levels in accordance with a time of day.

10. The controller of claim 8 where the lighting level corresponds to a lighting application.

11. The controller of claim 8 where the lighting level corresponds to a type of surface to be illuminated.

12. The controller of claim 8 where the lighting level corresponds to an activity level associated with a type of surface to be illuminated.

13. The controller of claim 8 where the lighting level corresponds to performance information obtained from each of the at least one of the multiplicity of light fixtures.

14. The controller of claim 8 where the lighting level corresponds to one or more weather conditions.

15. The controller of claim 1 where the processor is configured to selectively communicate with the at least one of the multiplicity of light fixtures to obtain performance related information associated with the at least one of the multiplicity of light fixtures.

16. The controller of claim 15 where the processor is configured to obtain performance information sufficient to determine power consumption of the at least one of the multiplicity of light fixtures.

17. The controller of claim 1 wherein the lighting level is an actual output lighting level of the at least one of the multiplicity of light fixtures, the actual output lighting level adapted to and substantially equal to a target lighting level over a service life of the at least one of the multiplicity of light fixtures.

18. The controller of claim 1 wherein the processor is configured to establish an output light level that varies in accordance with an activity level associated with a surface to be illuminated by the at least one of the multiplicity of light fixtures.

19. The controller of claim 18 wherein the activity level comprises a pedestrian conflict level.

20. The controller of claim 1, wherein the processor is configure to compensate the lighting level for the degradation of one or more components of the at least one of the multiplicity of geographically distributed light fixtures by setting the lighting level at a minimum acceptable output level and maintaining the minimum acceptable output level over a life cycle of the at least one of the multiplicity of geographically distributed light fixtures.

21. A method of adaptively monitoring and controlling a lighting system, the method comprising:
selectively communicating with each of a multiplicity of geographically distributed light fixtures, the multiplicity of geographically distributed light fixtures operable to provide general lumination to a geographical area;
maintaining a database containing information associated with each of the multiplicity of geographically distributed light fixtures, wherein a portion of the information is obtained from the each of the multiplicity of geographically distributed light fixtures by the selectively communicating; and
adaptively establishing lighting parameters for each of the multiplicity of geographically distributed light fixtures based on lighting information corresponding to the each of the multiplicity of geographically distributed light fixtures by the selectively communicating with each of the multiplicity of geographically distributed light fixtures, the lighting parameters establish a lighting level that is compensated for degradation of one or more components of the at least one of the multiplicity of geographically distributed light fixtures;
wherein the adaptively establishing further comprises establishing different lighting parameters for a first and a second one of the multiplicity of geographically distributed light fixtures based on different lighting status information associated with the first and the second one of the multiplicity of geographically distributed light fixtures.

22. The method of claim 21 where the adaptively establishing lighting parameters for the each of the multiplicity of light fixtures is based on lighting status information obtained from the each of the multiplicity of light fixtures.

23. The method of claim 21 where the adaptively establishing lighting parameters for the each of the multiplicity of light fixtures based on lighting status information further comprises establishing the lighting level for and based on lighting status information obtained from the each of the multiplicity of light fixtures, where the lighting status information corresponds to the information associated with each of the multiplicity of light fixtures.

24. The method of claim 21 where the selectively communicating comprises selectively communicating over a wireless interface to the multiplicity of light fixtures.

25. The method of claim 21 where the selectively communicating comprises selectively communicating over a wired interface to the multiplicity of light fixtures.

26. The method of claim 21 where the selectively communicating comprises selectively communicating over one or more gateways, where each gateway provides a communication link to one or more of the multiplicity of light fixtures.

27. The method of claim 21 where the selectively communicating further comprises selectively communicating with at least one of the multiplicity of light fixtures to adaptively establish the lighting level for the at least one of the multiplicity of light fixtures, where the lighting level is based on a schedule for the at least one of the multiplicity of light fixtures.

28. The method of claim 27 where the lighting level for the at least one of the multiplicity of light fixtures vary over three or more levels in accordance with a time of day.

29. The method of claim 27 where the lighting level corresponds to at least one of a lighting application, a surface to be illuminated, an activity level associated with the surface to be illuminated and environmental conditions in the location of the at least one of the multiplicity of light fixtures.

30. The method of claim 27 where the lighting levels correspond to a measured output light level information obtained from each of the at least one of the multiplicity of light fixtures.

31. The method of claim 21 where the maintaining a database further comprises maintaining a database including configuration information for each of the multiplicity of light fixtures and including information obtained by the selectively communicating with each of the multiplicity of light fixtures to obtain performance related information associated with the each of the multiplicity of light fixtures.

32. The method of claim 31 where the maintaining a database comprises obtaining performance information sufficient to determine power consumption of the each of the multiplicity of light fixtures.

33. The method of claim 31 where the maintaining a database comprises maintaining a database including behavior of one or more components associated with each of the multiplicity of light fixtures.

34. The method of claim 21, wherein the adaptively establishing lighting parameters comprises:
compensating the lighting level for the degradation of one or more components of the at least one of the multiplicity of geographically distributed light fixtures, including setting the lighting level at a minimum acceptable output level and maintaining the minimum acceptable output level over a life cycle of the at least one of the multiplicity of geographically distributed light fixtures.

35. A controller configured for adaptive monitoring and control of a lighting system, the controller comprising:
   a communication interface configured to communicate with a multiplicity of geographically distributed light fixtures;
   a memory for storing software routines and information associated with each of the multiplicity of geographically distributed light fixtures; and
   a processor coupled to the memory and the communication interface and configured to execute the software routines and selectively communicate with each of the multiplicity of geographically distributed light fixtures to adaptively establish lighting parameters for the each of the multiplicity of geographically distributed light fixtures,
   wherein the processor is configured to establish an output light level that varies in accordance with an activity level associated with a surface to be illuminated by the at least one of the multiplicity of geographically distributed light fixtures and is compensated for degradation of one or more components of the at least one of the multiplicity of geographically distributed light fixtures, and
   wherein the activity level comprises a vehicle activity level.

36. The controller of claim 35 wherein the processor is further configured to adaptively establish lighting parameters for the at least one of the multiplicity of light fixtures based on lighting information corresponding to the at least one of the multiplicity of light fixtures.

37. The controller of claim 36 wherein the processor is further configured to adaptively establish different lighting parameters for at least a different one of the multiplicity of light fixtures based on different lighting information associated with the at least a different one of the multiplicity of light fixtures.

38. The controller of claim 36 wherein the processor is further configured to selectively communicate with each of the at least one of the multiplicity of light fixtures to adaptively establish lighting levels for said each of the at least one of the multiplicity of light fixtures, where the lighting levels are, respectively, further based on a measured output light level information obtained from said each of the at least one of the multiplicity of light fixtures.

39. The controller of claim 35 wherein the memory is further for storing geographic location for each of the multiplicity of light fixtures.

40. The controller of claim 35, wherein the processor is configure to compensate the lighting level for the degradation of one or more components of the at least one of the multiplicity of geographically distributed light fixtures by setting the lighting level at a minimum acceptable output level and maintain the minimum acceptable output level over a life cycle of the at least one of the multiplicity of geographically distributed light fixtures.

* * * * *

UNITED STATES PATENT AND TRADEMARK OFFICE
CERTIFICATE OF CORRECTION

PATENT NO. : 8,433,426 B2  Page 1 of 1
APPLICATION NO. : 11/479222
DATED : April 30, 2013
INVENTOR(S) : Donald A. Cleland et al.

It is certified that error appears in the above-identified patent and that said Letters Patent is hereby corrected as shown below:

In the Specification:

Col. 6, lines 2-4, "(light output settings, collect error and operational logs, maintenance logs and the like and upload" should read --(light output settings, collect error and operational logs, maintenance logs and the like) and upload--;

Col 7, lines 34-35, "current or targeted performance, etc., etc. In general" should read --current or targeted performance, etc. In general--;

Col. 9, lines 55-57, "light fixture controller can adjust the via changing capacitance the output level" should read --light fixture controller can adjust via changing capacitance the output level--;

In the Claims:

Col. 13, lines 35-36, "wherein the processor is configure to compensate" should read --wherein the processor is configured to compensate--;

Col. 16, line 21, "wherein the processor is configure to compensate" should read --wherein the processor is configured to compensate--.

Signed and Sealed this
Twenty-sixth Day of November, 2013

Margaret A. Focarino
*Commissioner for Patents of the United States Patent and Trademark Office*